(12) United States Patent
Sharpensteen et al.

(10) Patent No.: US 6,893,156 B2
(45) Date of Patent: May 17, 2005

(54) PAD ASSEMBLY ADAPTED FOR RECEIVING AN X-RAY CASSETTE AND METHOD OF USING THE SAME

(75) Inventors: Charles C. Sharpensteen, Hudson, OH (US); Mark Lindenmuth, Valley City, OH (US)

(73) Assignee: Steris Inc., Temecula, CA (US)

( * ) Notice: Subject to any disclaimer, the term of this patent is extended or adjusted under 35 U.S.C. 154(b) by 0 days.

(21) Appl. No.: 10/736,145

(22) Filed: Dec. 15, 2003

(65) Prior Publication Data

US 2004/0141589 A1 Jul. 22, 2004

Related U.S. Application Data

(60) Provisional application No. 60/440,985, filed on Jan. 17, 2003.

(51) Int. Cl.[7] ............................................. G03B 42/02
(52) U.S. Cl. ........................ 378/177; 378/172; 5/601
(58) Field of Search ................................ 378/177, 169, 378/172, 209; 5/600, 601, 625

(56) References Cited

U.S. PATENT DOCUMENTS

| | | | |
|---|---|---|---|
| 3,551,923 A | 1/1971 | Franklin | 5/345 |
| 4,454,615 A | 6/1984 | Whitney | 5/449 |
| 4,584,989 A | 4/1986 | Stith | 128/1 D |
| 4,665,574 A | 5/1987 | Filips et al. | 5/462 |
| 4,669,136 A | 6/1987 | Waters et al. | 5/66 |
| 4,882,797 A | 11/1989 | Failor et al. | 5/66 |
| 5,127,034 A | 6/1992 | Wright | 378/209 |
| 5,166,968 A * | 11/1992 | Morse | 378/177 |
| 5,255,303 A | 10/1993 | DiMaio et al. | 378/177 |
| 5,703,925 A * | 12/1997 | Wright | 378/181 |
| 5,771,513 A | 6/1998 | Kirchgeorg et al. | 5/625 |
| 5,860,174 A | 1/1999 | Failor | 5/81.1 HS |
| 6,151,732 A * | 11/2000 | Heimbrock et al. | 5/601 |
| 6,163,902 A | 12/2000 | Mollette et al. | 5/601 |
| 6,266,831 B1 | 7/2001 | Heimbrock | 5/601 |
| 6,374,438 B1 | 4/2002 | Fox et al. | 5/600 |
| 6,398,409 B1 | 6/2002 | Brooks | 378/209 |
| 6,722,783 B2 * | 4/2004 | Jackson, Sr. | 378/178 |
| 2003/0123616 A1 * | 7/2003 | Jackson, Sr. | 378/178 |

OTHER PUBLICATIONS

BMP™ X–Ray Cassette Drape Product Brochure; Bionet, Inc., 1999.

* cited by examiner

Primary Examiner—Craig E. Church
Assistant Examiner—Irakli Kiknadze
(74) Attorney, Agent, or Firm—Kusner & Jaffe; Michael A. Centanni (57) ABSTRACT

A pad assembly adapted to receive an envelope enclosing an x-ray cassette, thus allowing x-rays to be taken while a patient is lying or sitting on the pad assembly. The pad assembly allows a conventional hospital stretcher to be converted for use as a specialized x-ray stretcher.

34 Claims, 9 Drawing Sheets

PAD ASSEMBLY ADAPTED FOR RECEIVING AN X-RAY CASSETTE AND METHOD OF USING THE SAME

RELATED APPLICATIONS

This application claims the benefit of U.S. Provisional Application No. 60/440,985 filed on Jan. 17, 2003.

FIELD OF THE INVENTION

The present invention relates generally to a pad assembly for use on a medical stretcher, and more particularly to a pad assembly adapted to receive an x-ray cassette to allow x-rays to be taken while a patient is lying or sitting on the pad assembly.

BACKGROUND OF THE INVENTION

A typical hospital stretcher is comprised of a metal frame supporting a mattress pad(s) on which a patient lies or sits. Some hospital stretchers are specially designed to allow x-rays to be taken while a patient is lying or sitting thereon. On these types of "x-ray stretchers," a mattress pad is placed on a "radiolucent" support surface that allows x-rays to pass therethrough. An x-ray plate (conventionally referred to as an x-ray "cartridge" or x-ray "cassette") is placed on a support surface below the mattress pad and below the radiolucent support surface. Such x-ray stretchers are cumbersome and expensive to fabricate. Furthermore, in such x-ray stretchers the x-ray cassette is positioned several inches below the patient. In other words, the x-ray cassette is separated from the patient by the mattress pad and the radiolucent support surface. As a result, the quality of the x-ray image is impaired.

The present invention addresses these and other problems of the prior art to provide a pad assembly that allows an x-ray cassette to be received within the pad assembly.

SUMMARY OF THE INVENTION

In accordance with the present invention, there is provided a pad assembly adapted to receive an x-ray cassette to allow x-rays to be taken while a patient is lying or sitting on the pad assembly.

In accordance with another aspect of the present invention, there is provided a method of using a pad assembly adapted for receiving an x-ray cassette.

An advantage of the present invention is the provision of a pad assembly adapted for receiving an x-ray cassette, and is used with a conventional hospital stretcher.

Another advantage of the present invention is the provision of a pad assembly adapted for receiving an x-ray cassette that is easier to use than specialized x-ray stretchers.

Another advantage of the present invention is the provision of a pad assembly adapted for receiving an x-ray cassette that provides higher quality x-ray images than obtained using specialized x-ray stretchers.

A still further advantage of the present invention is the provision of a pad assembly adapted for receiving an x-ray cassette that is less costly to manufacture than specialized x-ray stretchers.

Yet another advantage of the present invention is the provision of a pad assembly adapted for receiving an x-ray cassette that is easier to maintain than specialized x-ray stretchers.

Yet another advantage of the present invention is the provision of a pad assembly adapted for receiving an x-ray cassette that allows a faster and more efficient x-ray process.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF A PREFERRED EMBODIMENT

Figure 1:
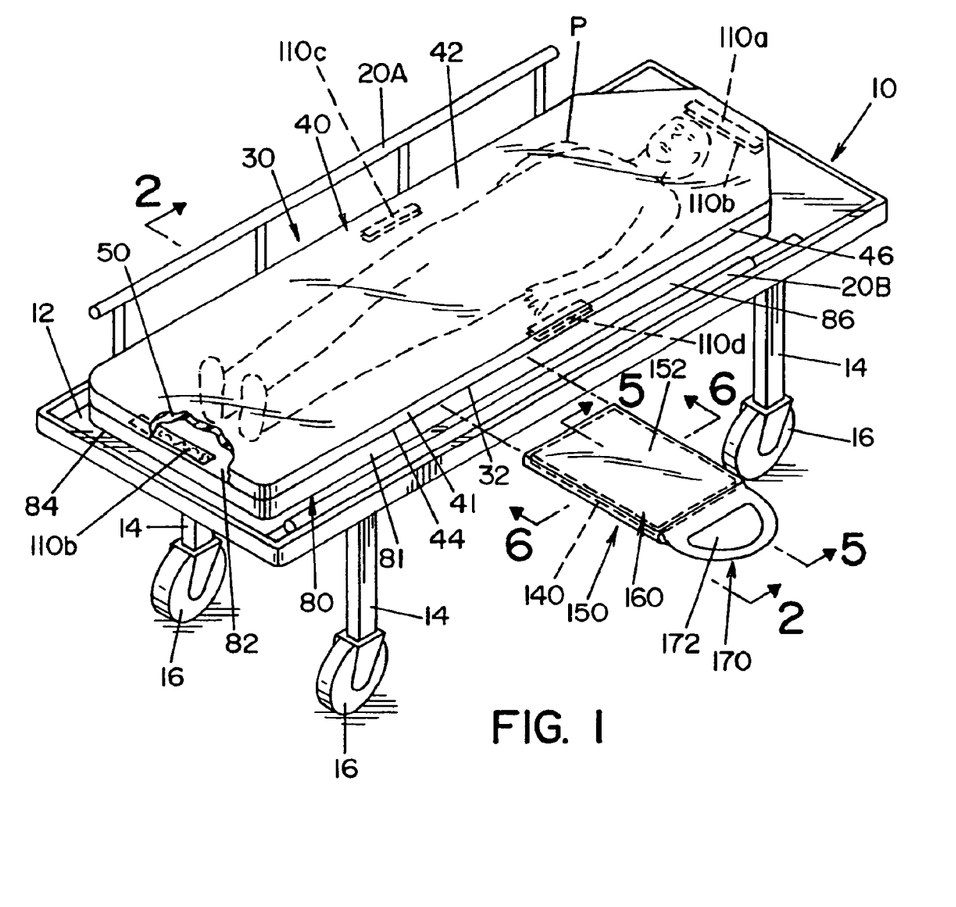
FIG. 1 is a perspective view of a conventional hospital stretcher supporting a pad assembly including a hook-and-loop fastener attachment member, according to a preferred embodiment of the present invention, and an x-ray cassette envelope according to a preferred embodiment.

Referring now to the drawings wherein the showings are for the purposes of illustrating a preferred embodiment of the invention only and not for purposes of limiting same, FIG. 1 shows a stretcher 10 supporting a pad assembly 30 according to a preferred embodiment of the present invention. FIG. 1 also shows a holder or envelope 150 according to a preferred embodiment of the present invention, that covers an x-ray cassette 140. Envelope 150 may take the form of a conventionally known x-ray cassette "drape."

Stretcher 10 is a conventional stretcher generally comprised of a generally planar platform 12, a plurality of legs 14, a caster wheel 16 at the end of each leg 14, and retractable rail assemblies 20A and 20B. Platform 12 provides a support surface for pad assembly 30.

Pad assembly 30 is generally comprised of an elongated upper pad 40, and an elongated lower pad 80 generally conforming in shape to upper pad 40. Upper pad 40 includes an outer shell 41 having an upper surface 42, a lower surface 44 and a plurality of side surfaces 46 that enclose a foam core 50. By way of example and not limitation, surfaces 42, 44, and 46 of shell 41 are preferably made of a polymer-coated fabric material, having a relatively smooth outer surface. More preferably, the polymer-coated fabric material should be an anti-static material to prevent static electricity shock. Materials, such as SURE-CHEK® COMFORT™, SURE-CHEK® FUSION™, SURE-CHEK® FUSION II™, and like fabrics from Herculite, Inc. of Emigsville, Pa., find advantageous application in forming outer shell 41. The SURE-CHEK® fabrics are strong, durable, abrasion resistant and minimize sliding. These polymer-coated fabrics also resist fluid and moisture penetration, resist staining and have antimicrobial properties to protect the fabric.

In a preferred embodiment, foam core 50 is an open cell urethane foam having about 1.8 lb. density, and 30–40 lb. (preferably 35 lb.) ILD (Indentation Load Deflection). Foam core 50 preferably has a thickness in the range of 1–2 inches, and preferably about 1.5 inches.

Lower pad 80 includes an outer shell 81 having an upper surface 82, a lower surface 84 and a plurality of side surfaces 86 that enclose a foam core 90. By way of example and not limitation, surfaces 82 and 86 of shell 81 are made of the same materials discussed above in connection with the surfaces 42, 44 and 46 of upper pad 40. Lower surface 84 of shell 81 may be made of the same material as surfaces 82 and 86, but it is preferably made of a material providing greater friction, to prevent sliding relative to platform 12 of stretcher 10.

In a preferred embodiment, foam core 90 is an open cell urethane foam having a about 2.8 lb. density, and 40–50 lb. (preferably about 55 lb.) ILD. Foam core 50 preferably has a thickness in the range of 2–3 inches, and preferably about 2.5 inches.

Figure 9:
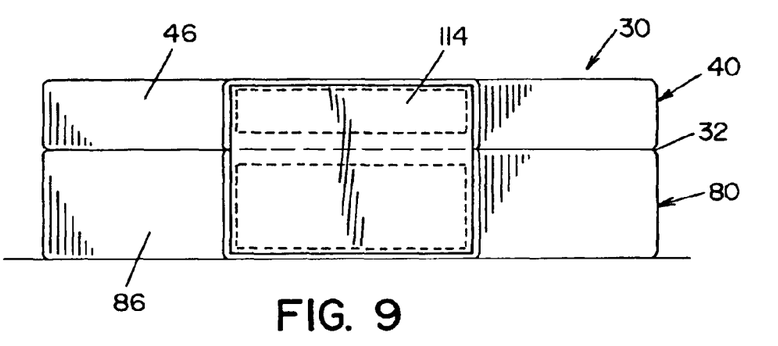
FIG. 9 is an end view of a pad assembly having a fabric attachment member, according to an alternative embodiment of the present invention.
Figure 10:
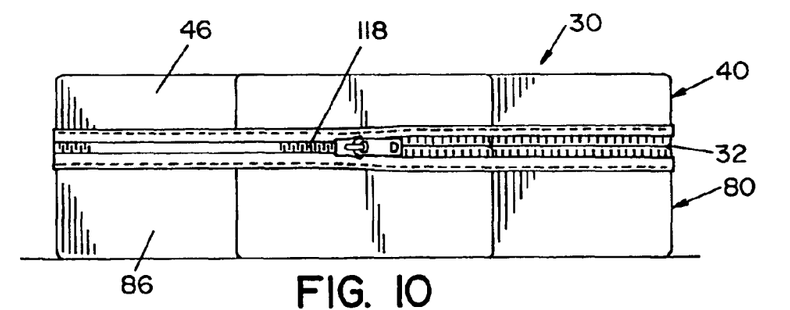
FIG. 10 is an end view of a pad assembly having a zipper attachment member, according to another alternative embodiment of the present invention.

Upper pad 40 and lower pad 80 are joined together to basically define an unobstructed slot 32 between attached edges of pads 40, 80. In a preferred embodiment, upper and lower pads 40, 80 are joined at longitudinal ends and sides thereof by a plurality of attachment members in the form of a plurality of hook-and-loop fasteners 110a, 110b, 110c and 110d (e.g., a VELCRO strip). In this regard, mating hook-and-loop fasteners 110a, 110b, 110c and 110d are respectively secured (e.g., stitched or glued) to lower surface 44 of upper pad 40, and to upper surface 82 of lower pad 80. In the illustrated embodiment, fasteners 110a, 110b are located at distal ends of pads 40 and 80, while fasteners 110c and 110d are located along the sides of pads 40 and 80. It should be appreciated that the number of fasteners, and the illustrated location of the fasteners are exemplary only, and are not intended to limit the scope of the present invention. Furthermore, in alternative embodiments, the attachment members may take the form of a strip of fabric 114 stitched to the pads 40 and 80 (FIG. 9), or a zipper 118 joining pads 40 and 80 (FIG. 10). Zipper 118 may extend along the entire periphery of pad assembly 30. It should be understood that lower surface 44 of pad 40 and upper surface 84 of pad 80 are unattached in the regions between attachment members.

Figure 11:
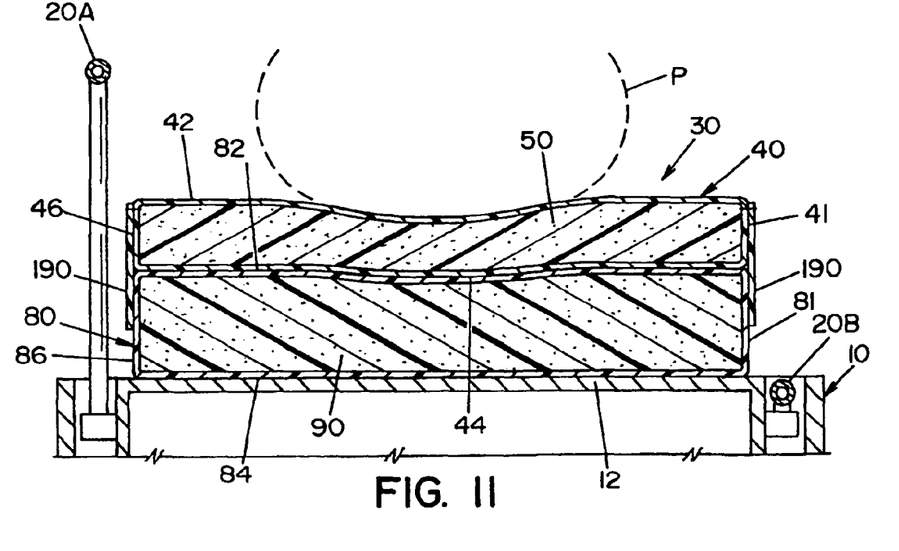
FIG. 11 is a cross-sectional view of a pad assembly having side flaps, according to an alternative embodiment of the present invention.

Referring now to FIG. 11, there is shown an alternative embodiment of pad assembly 30. In this embodiment, flaps 190 are attached to the lengthwise sides of upper pad 40. Flaps 190 are preferably dimensioned to extend over slot 32 to act as a fluid guard, thus preventing contaminants from entering slot 32. Flaps 190 also provide a surface for griping upper pad 40, and thus facilitate separation of upper pad 40 and lower pad 80. In a preferred embodiment, flaps 190 are made of the same material as surfaces 42, 44 and 46 of upper pad 40.

Figure 5:
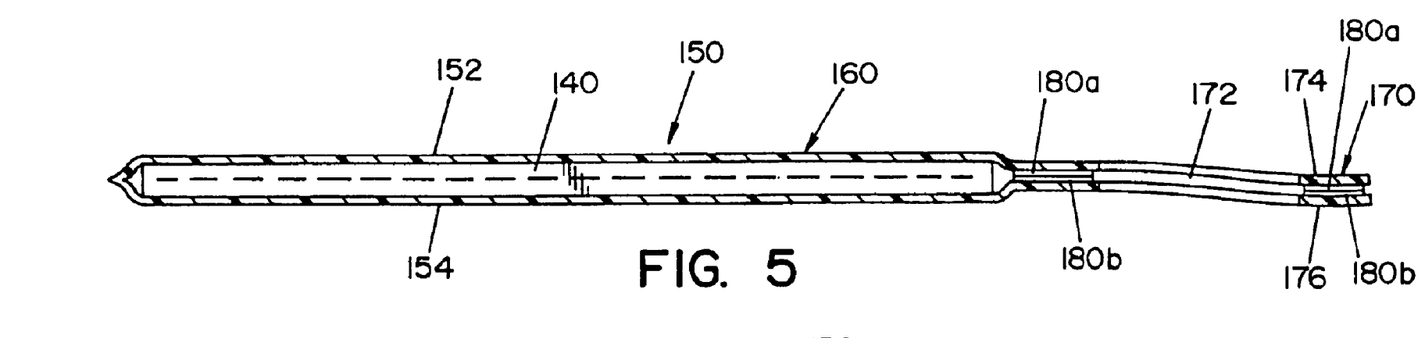
FIG. 5 is a cross-sectional view of the envelope taken along lines 5—5 of FIG. 1.
Figure 6:
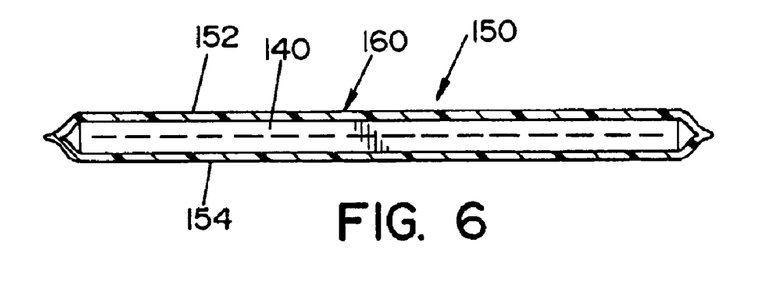
FIG. 6 is a cross-sectional view of the envelope taken along lines 6—6 of FIG. 1.
Figure 7:
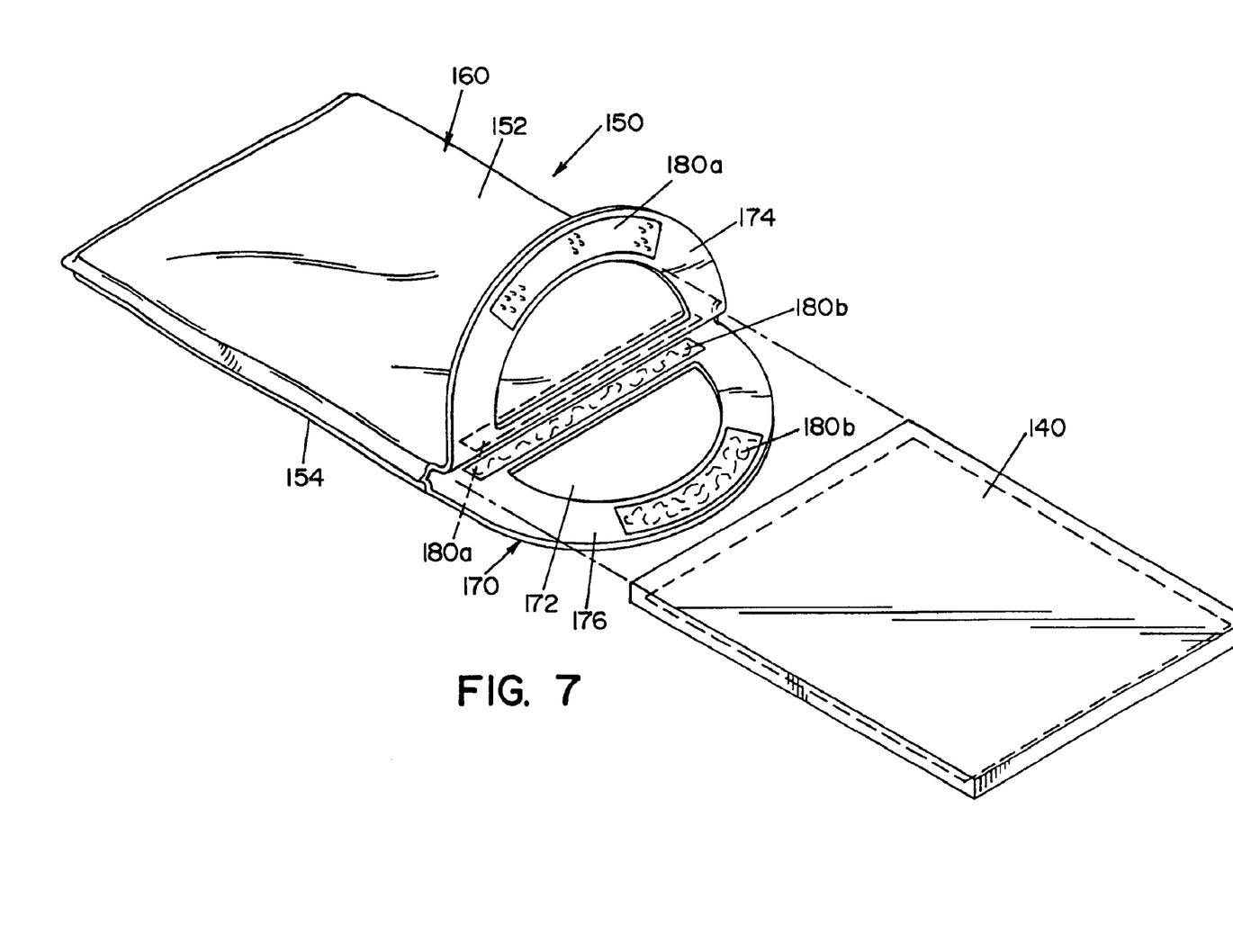
FIG. 7 is a perspective view of an envelope according to a preferred embodiment, wherein the envelope is shown in an open position to receive an x-ray cassette.

A preferred embodiment of envelope 150 will now be described with particular reference to FIGS. 5 and 6. Envelope 150 is generally comprised of a first cover portion 152 and a second cover portion 154. A section of cover portions 152 and 154 are attached together along the edges thereof, thereby forming a pouch portion 160 and a handle 170. Cover portions 152 and 154 may be attached by fusing, stitching, or the like. Pouch portion 160 is dimensioned to receive x-ray cassette 140. Handle 170 is comprised of a first handle portion 174 and a second handle portion 176. A fastening means, such as mating hook-and-loop fasteners 180a, 180b are provided to attach first handle portion 174 to second handle portion 176. Handle 170 preferably includes a recess 172 to facilitate gripping handle 170. It should be appreciated that in an alternative embodiment, handle 170 may be omitted from envelope 150.

Envelope 150 is preferably made of a material providing less friction than the material used for lower surface 44 of upper pad 40 and upper surface 82 of lower pad 80, defining slot 32. By way of example and not limitation, envelope 150 is made of a 0.010 thick cotton/poly fabric sold under mark CHEMLAM® 700. CHEMLAM® 700 is a trademark of Chemfab Corporation, and refers to a multi-layer static dissipative fluoropolymer film with a filly sintered PTFE (TEFLON) surface for low friction, chemical and flame resistance, and barrier properties, laminated to a flexible cotton/polyester fabric substrate.

Figure 8:
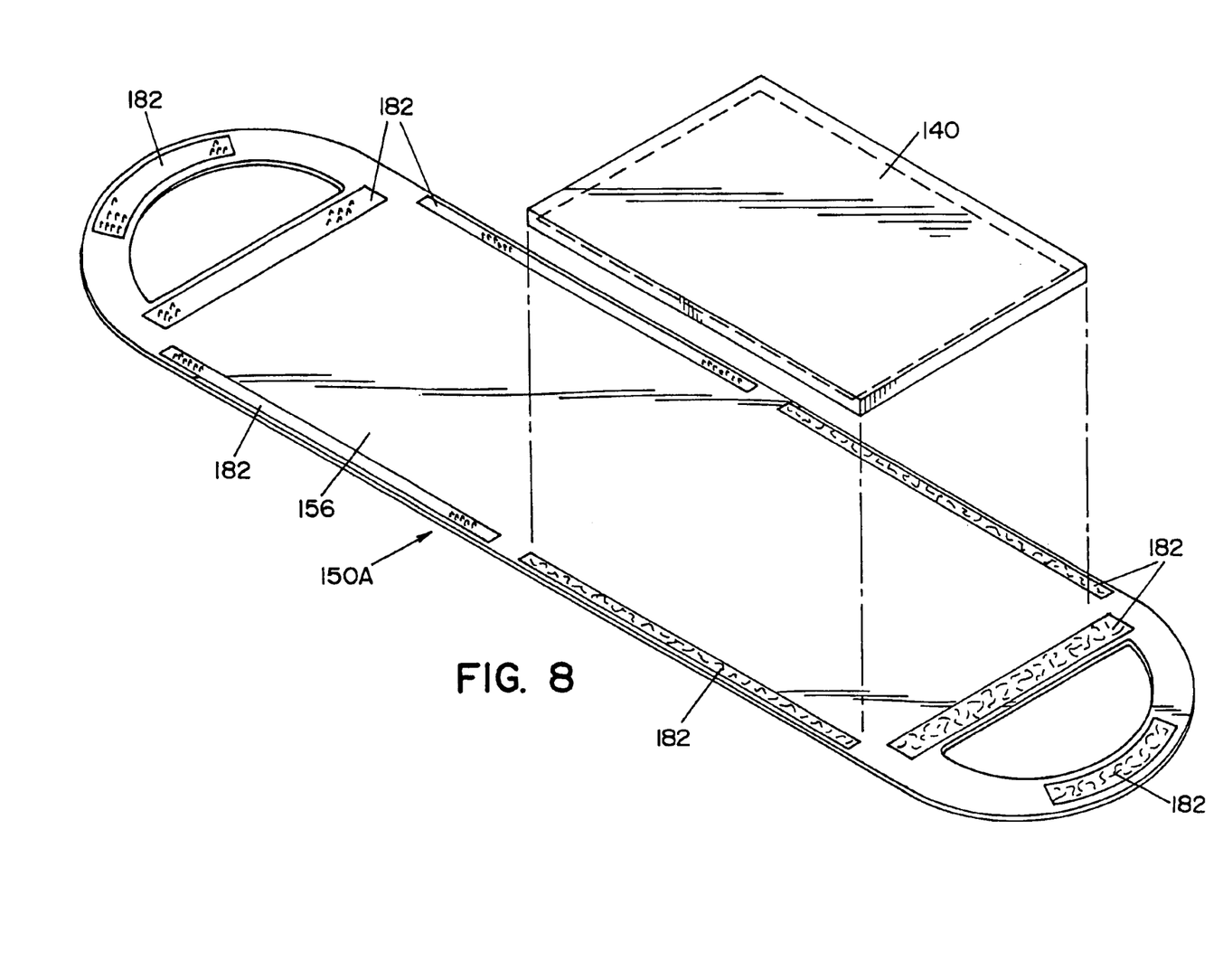
FIG. 8 is a perspective view of an envelope according to an alternative embodiment, wherein the envelope is shown in an open position to receive an x-ray cassette.

Envelope 150A, according to an alternative embodiment, will now be described with reference to FIG. 8. Envelope 150A is comprised of a single cover sheet 156 that is folded over itself to form pouch portion 160 and handle 170. In the illustrated embodiment, hook-and-loop fasteners 182 are used to attach the respective ends of cover sheet 156.

One well known method for determining the static coefficient of friction ($\mu$) between first and second objects is to position the first object on the second object at an incline defined by a right triangle, and determining the tangent of the angle of incline ($\upsilon$) at which the force of gravity overcomes the static friction (i.e., the angle at which the first object just begins to slide on the second object). Tan($\upsilon$) is also equal to the height (h) of the side of the triangle opposite angle $\upsilon$ divided by the length (l) of the side of the triangle adjacent angle($\upsilon$). It will be appreciated that coefficients of friction ($\mu$) are given for one surface on another surface, where the higher the coefficient of friction ($\mu$), the greater the force of friction.

Tests with the present invention indicate that the coefficient of friction ($\mu$) for the preferred embodiment is likely to be in the ranges noted in TABLE 1 below:

TABLE 1

| Surface Conditions | Coefficient of Friction ($\mu$) Range |
| --- | --- |
| a typical x-ray cassette (without envelope 150) on lower pad 80 (no upper pad 40) | 0.32 +/− 0.1 |
| envelope 150 (enclosing a typical x-ray cassette) on lower pad 80 (no upper pad 40) | 0.11 +/− 0.05 |

TABLE 1-continued

| Surface Conditions | Coefficient of Friction ($\mu$) Range |
|---|---|
| a typical x-ray cassette (without envelope 150) sandwiched between lower pad 80 and upper pad 40 - no person lying on pad assembly 30 | 0.61 +/- 0.1 |
| envelope 150 (enclosing a typical x-ray cassette) sandwiched between lower pad 80 and upper pad 40 - no person lying on pad assembly 30 | 0.29 +/- 0.1 |

In view of the data indicated in TABLE 1, it would appear that use of envelope 150 reduces the coefficient of friction by roughly one-third.

Figure 2:
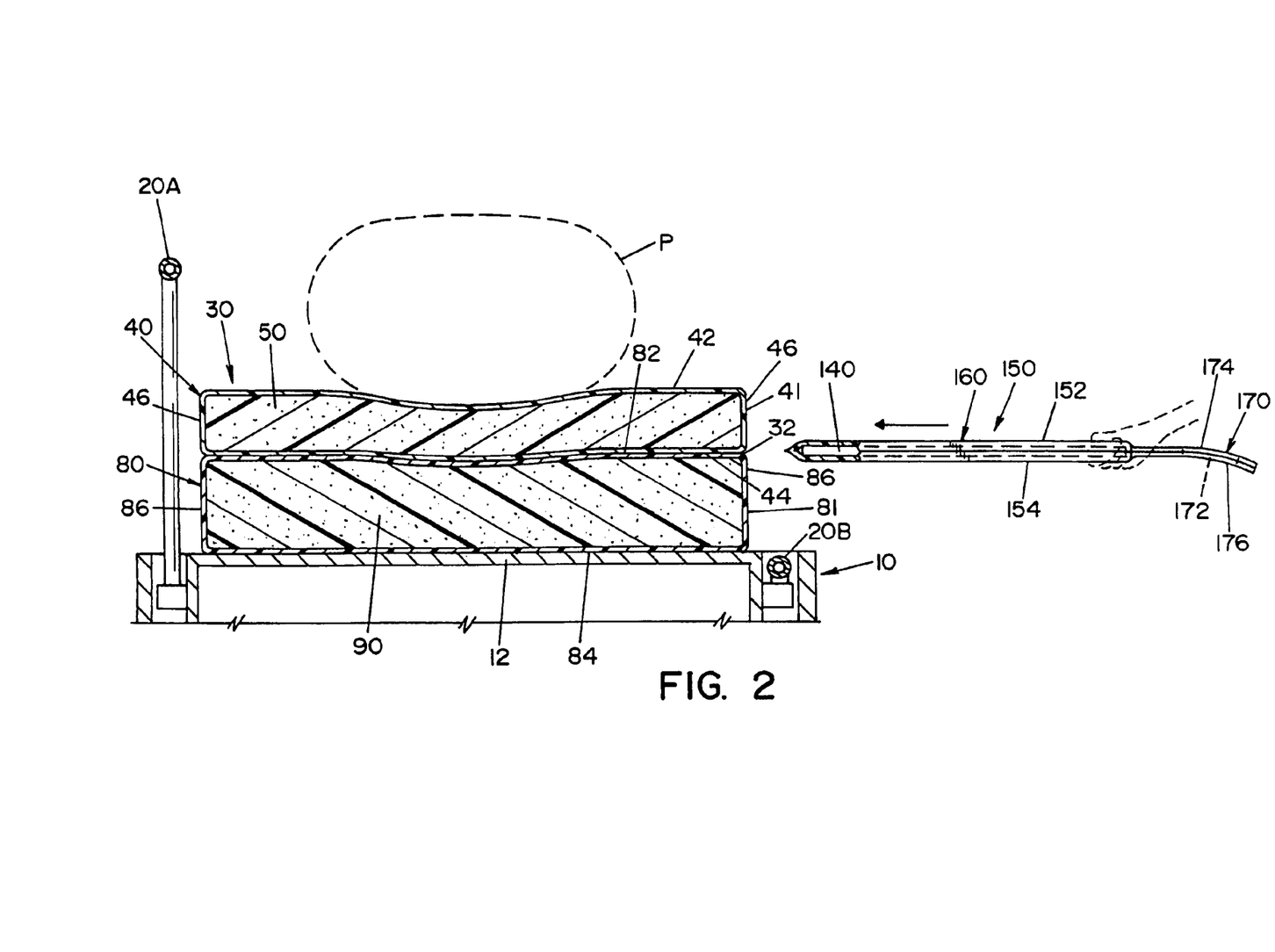
FIG. 2 is a cross-sectional view of the pad assembly and envelope, taken along lines 2—2 of FIG. 1.
Figure 3:
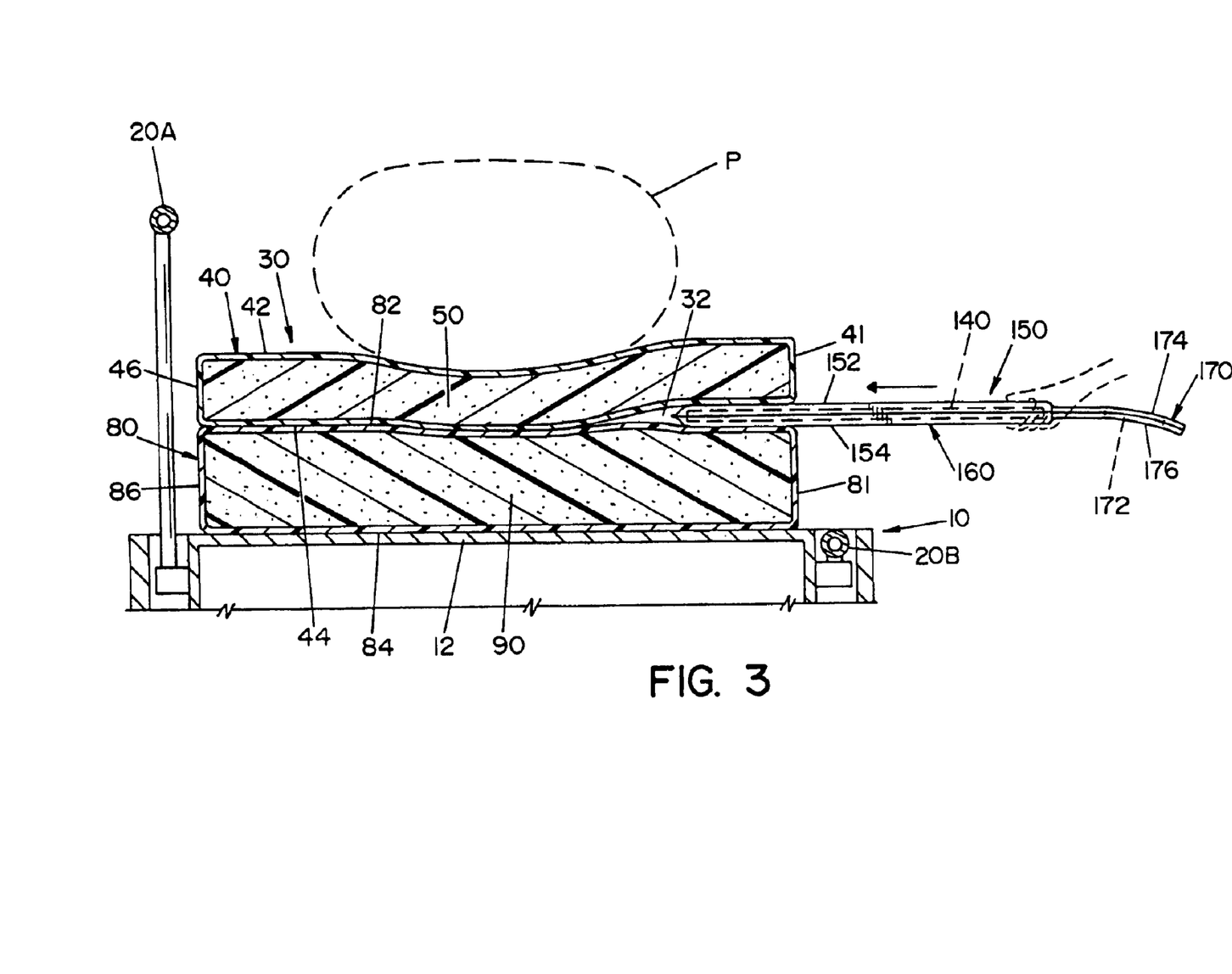
FIG. 3 is a cross-section view as shown in FIG. 2, illustrating the envelope partially inserted into the pad assembly.
Figure 4:
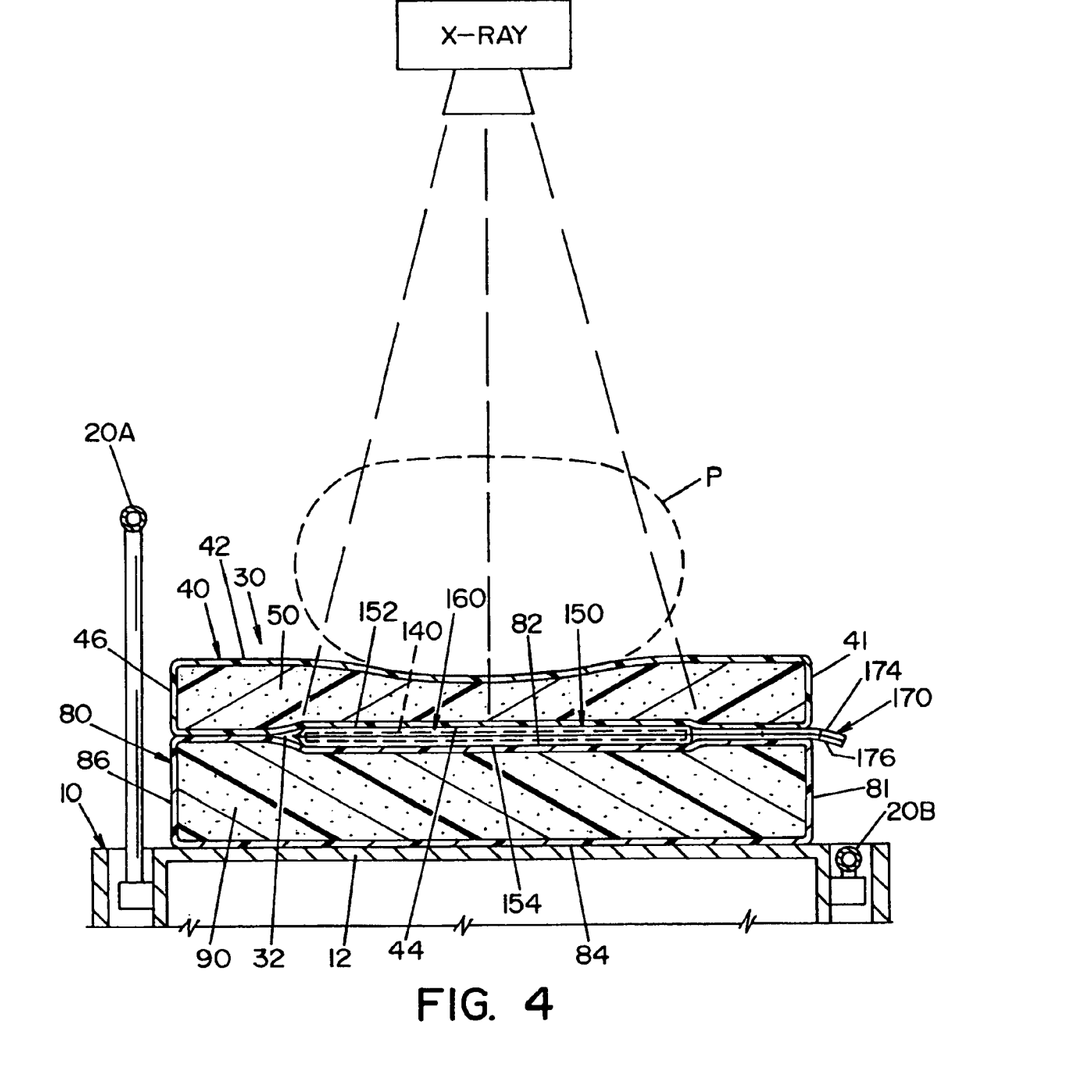
FIG. 4 is a cross-section view as shown in FIG. 2, illustrating the envelope fully inserted into the pad assembly, and oriented relative to an x-ray apparatus.

Use of pad assembly 30 and envelope 150 will now be described with particular reference to FIGS. 2–4 and 7. Envelope 150 is opened to allow a conventional x-ray cassette 140 to be inserted into pouch portion 160. Envelope 150 is then closed by attaching first handle portion 174 and second handle portion 176. With a patient P lying upon pad assembly 30, envelope 150 is inserted into slot 32 (FIGS. 2 and 3). It should be appreciated that patient P refers to both humans and animals, including living and deceased. The smooth surfaces 44 and 82 of pads 40 and 80, and low friction provided by cover portions 152 and 154 of envelope 150 allow relatively easy sliding and positioning of envelope 150 between pads 40 and 80. In this respect, it is contemplated that an x-ray cassette 140 without envelope 150 may be used, but preferably cassette 140 is within pouch portion 160 of envelope 150 to facilitate easier insertion and positioning of x-ray cassette within slot 32. Envelope 150 is preferably oriented in slot 32 such that the x-ray cassette is located directly below patient P where an x-ray image is desired (FIG. 4). Preferably, handle 170 extends outside of slot 32 to facilitate removal of envelope 150 therefrom. After the x-ray image has been taken, envelope 150 is removed from slot 32. Envelope 150 is then open, and x-ray cassette 140 is removed from pouch portion 160.

Figure 12:
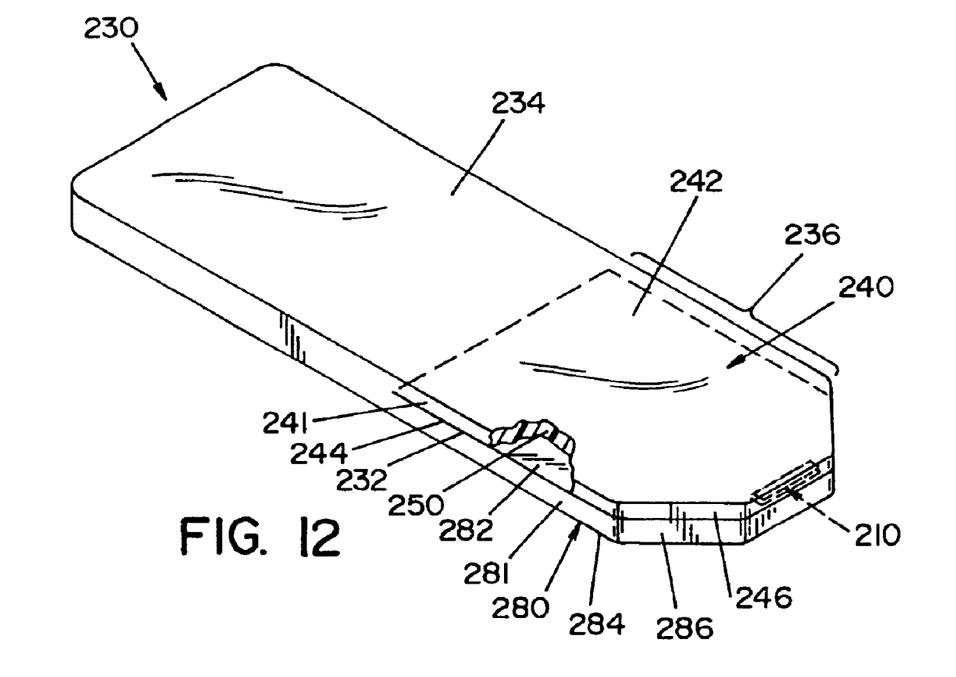
FIG. 12 is a perspective view of a pad assembly, according to yet another alternative embodiment of the present invention.

Referring now to FIG. 12, another alternative embodiment of the present invention will be described. Pad assembly 230 is comprised of a single pad 234 including a single foam core 250 encapsulated by an outer shell, and having a slotted section 236 formed by a slot 232. Slot 232 divides foam core 250, and preferably extends along approximately one-half the length of pad 234. Slotted section 236 is generally comprised of an upper pad portion 240 and a lower pad portion 280, generally conforming in shape to upper pad portion 240. Upper pad portion 240 includes an outer shell portion 241 having an upper surface 242, a lower surface 244 and a plurality of side surfaces 246 that enclose a first foam core section 250. Surfaces 242, 244, and 246 of shell 241 are preferably made of the same material as discussed above in connection with upper pad 40. Lower pad portion 280 includes an outer shell portion 281 having an upper surface 282, a lower surface 284 and a plurality of side surfaces 286 that enclose a second foam core section 250. Surfaces 282 and 286 of shell 281 are preferably made of the same materials discussed above in connection with upper pad 40. Lower surface 284 of shell 281 may be made of the same material as surfaces 282 and 286, but it is preferably made of a material providing greater friction, to prevent sliding relative to platform 12 of stretcher 10. An optional attachment member 210 may be provided to join together upper and lower pad portions 240 and 280.

Figure 13:
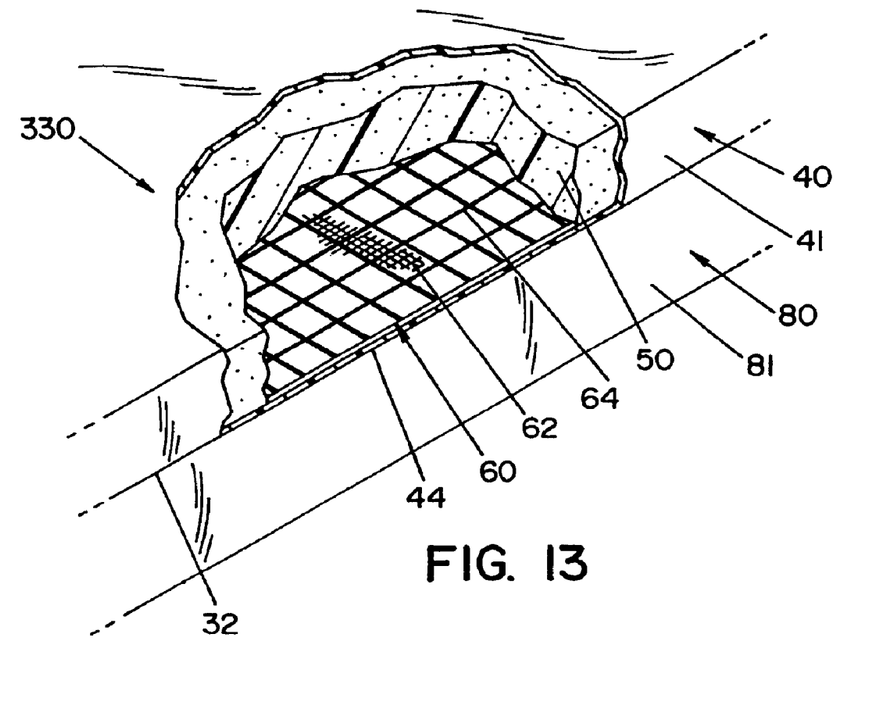
FIG. 13 is a perspective view of a cut-away portion of a pad assembly, according to still another alternative embodiment of the present invention.

FIG. 13 illustrates yet another embodiment of the present invention. Pad assembly 330 is the same as pad assembly 30 in most respects. Accordingly, similar components bear the same reference numbers. Pad assembly 330 includes a grid member 60 located between foam core 50 and lower surface 44 of outer shell 41. In the illustrated embodiment, grid member 60 includes a sheet media 62 and a radiopaque grid 64 formed therein. Sheet media 62 may take the form of a woven fabric material. Radiopaque grid 64 is formed of a material that will cause a grid (e.g., a scaled grid) to appear on an x-ray image to facilitate dimensional analysis of the x-ray image. By way of example, and not limitation, radiopaque grid 64 may be printed, painted, or woven onto sheet media 62. Alternatively, radiopaque grid 64 may be applied directly to lower surface 44 of outer shell 41 by the aforementioned means, in substitution of sheet media 62. It should be appreciated that radiopaque grid 64 may also be located on or in one pad of pad assembly 30 in locations other than those illustrated.

Other modifications and alterations will occur to others upon their reading and understanding of the specification. For example, it should be appreciated that in an alternative embodiment of the present invention, the relatively low friction material used for envelope 150 may be suitably substituted for the relatively higher friction material used for surfaces 42, 44 and 46 of outer shell 41, and surfaces 82 and 86 of outer shell 81. In yet another alternative embodiment, the relatively higher friction material used for surfaces 42, 44 and 46 of outer shell 41, and surfaces 82 and 86 of outer shell 81 may be used for envelope 150, while the low friction material (used for envelope 150) is used for surfaces 42, 44 and 46 of upper pad 40, and surfaces 82 and 86 of lower pad 80. It is intended that all such modifications and alterations be included insofar as they come within the scope of the invention as claimed or the equivalents thereof.

Having described the invention, the following is claimed:

1. A method of x-raying a patient, comprising the steps of:
   (a) positioning a patient on a pad assembly comprised of an upper pad and a lower pad that are attached, wherein said upper pad and said lower pad each include a respective outer shell enclosing an inner foam core, a lower surface of the respective outer shell of the upper pad facing an upper surface of the respective outer shell of said lower pad, at least one of said lower and upper surfaces formed of a first material, wherein an unobstructed slot is defined between said lower surface and said upper surface;
   (b) inserting an x-ray cassette into said slot between said upper and lower surfaces to a desired location beneath said patient;
   (c) exposing the x-ray cassette to x-rays to generate an x-ray image of a desired location of said patient; and
   (d) removing said x-ray cassette from between said upper and lower surfaces.

2. A method of x-raying a patient according to claim 1, wherein a coefficient of friction between said first material and said x-ray cassette is less than about 0.42.

3. A method of x-raying a patient according to claim 1, wherein said first material includes a polytetrafluoroethylene (PTFE) coating.

4. A method of x-raying a patient according to claim 1, wherein said x-ray cassette is contained within a holder formed of a second material having a relatively smooth outer surface.

5. A method of x-raying a patient according to claim 4, wherein a coefficient of friction between said first material and said second material is less than about 0.16.

6. A method of x-raying a patient according to claim 4, wherein said second material includes a polytetrafluoroethylene (PTFE) coating.

7. A pad assembly that allows x-raying a patient positioned thereon, the pad assembly comprising:
- an elongated upper pad including a first outer shell enclosing a first foam core, said first outer shell having a lower surface formed of a first material having a relatively smooth outer surface;
- an elongated lower pad generally conforming in shape to said upper pad, said lower pad including a second outer shell enclosing a second foam core, said second outer shell having an upper surface formed of the first material; and
- attachment means for joining the upper pad to the lower pad, said lower surface and said upper surface defining an unobstructed slot between said upper and lower pad along the length of said pads, said slot dimensioned to receive an x-ray cassette.

8. A pad assembly according to claim 7, wherein a coefficient of friction between said first material and said x-ray cassette is less than about 0.42.

9. A pad assembly according to claim 7, wherein said first material includes a polytetrafluoroethylene (PTFE) coating.

10. A pad assembly according to claim 7, wherein said x-ray cassette is contained within a holder formed of a second material having a relatively smooth outer surface.

11. A pad assembly according to claim 10, wherein a coefficient of friction between said second material and said first material is less than about 0.16.

12. A pad assembly according to claim 10, wherein said second material includes a polytetrafluoroethylene (PTFE) coating.

13. A pad assembly according to claim 7, wherein said attachment means is selected from the group consisting of: hook-and-loop fastener, fabric stitched to said upper and lower pads, and a zipper attached to said upper and lower pads.

14. A pad assembly according to claim 13, wherein said attachment means is a zipper attached to said upper and lower pads, said zipper arranged along peripheral edges of said upper and lower pads.

15. A pad assembly according to claim 13, wherein said attachment means is a hook-and-loop fastener attached to said upper and lower pads, said hook-and-loop fastener arranged along at least one peripheral edge of said upper and lower pads.

16. A pad assembly according to claim 13, wherein said attachment means joins said upper and lower pad along at least one peripheral edge thereof, said first and second pad being unattached at a region outside said attachment means.

17. A pad assembly according to claim 7, wherein said pad assembly further comprises lateral flaps extending from said upper pad to cover at least a portion of said slot.

18. A pad assembly according to claim 7, wherein said pad assembly is supported on a stretcher.

19. A pad assembly according to claim 7, wherein said pad assembly further comprises a radiopaque grid.

20. A pad assembly according to claim 19, wherein said radiopaque grid is applied to a sheet media enclosed within said first outer shell.

21. A pad assembly according to claim 19, wherein said radiopaque grid is applied to said first outer shell.

22. A method of x-raying a patient, comprising the steps of:
- (a) positioning a patient on a pad assembly comprised of an upper pad portion and a lower pad portion, wherein said upper pad portion and said lower pad portion each include a respective outer shell enclosing an inner foam core, wherein an unobstructed slot is defined between the upper pad portion and the lower pad portion, said respective outer shell of the upper pad portion having a lower surface facing an upper surface of the respective outer shell of said lower pad portion, at least one of said lower and upper surfaces formed of a first material;
- (b) inserting an x-ray cassette into said slot between said upper and lower surfaces to a desired location beneath said patient;
- (c) exposing the x-ray cassette to x-rays to generate an x-ray image of a desired location of said patient; and
- (d) removing said x-ray cassette from between said upper and lower surfaces.

23. A method of x-raying a patient according to claim 22, wherein a coefficient of friction between said first material and said x-ray cassette is less than about 0.42.

24. A method of x-raying a patient according to claim 23, wherein said first material includes a polytetrafluoroethylene (PTFE) coating.

25. A method of x-raying a patient according to claim 22, wherein said x-ray cassette is contained within a holder formed of a second material having a relatively smooth outer surface.

26. A method of x-raying a patient according to claim 25, wherein a coefficient of friction between said first material and said second material is less than about 0.16.

27. A method of x-raying a patient according to claim 25, wherein said second material includes a polytetrafluoroethylene (PTFE) coating.

28. A pad assembly that allows x-raying a patient positioned thereon, the pad assembly comprising:
- an upper pad portion including a first outer shell enclosing a first foam core section, said first outer shell having a lower surface formed of a first material having a relatively smooth outer surface; and
- a lower pad portion generally conforming in shape to said upper pad, said lower pad portion including a second outer shell enclosing a second foam core section, said second outer shell having an upper surface formed of the first material, said lower surface and said upper surface defining an unobstructed slot between said upper and lower pad portions, said slot dimensioned to receive an x-ray cassette.

29. A pad assembly according to claim 28, wherein a coefficient of friction between said first material and said x-ray cassette is less than about 0.42.

30. A pad assembly according to claim 28, wherein said first material includes a polytetrafluoroethylene (PTFE) coating.

31. A pad assembly according to claim 28, wherein said x-ray cassette is contained within a holder formed of a second material having a relatively smooth outer surface.

32. A pad assembly according to claim 31, wherein a coefficient of friction between said second material and said first material is less than about 0.16.

33. A pad assembly according to claim 31, wherein said second material includes a polytetrafluoroethylene coating.

34. A pad assembly according to claim 28, wherein said pad assembly further comprises a radiopaque grid.

* * * * *